United States Patent [19]
Thomas

[11] 4,048,829
[45] Sept. 20, 1977

[54] GASKET WINDING MACHINE

[76] Inventor: Hector Thomas, 59 Melvill St., Southdale, Johannesburg, Transvaal, South Africa

[21] Appl. No.: 492,818

[22] Filed: July 29, 1974

[30] Foreign Application Priority Data

July 6, 1973 South Africa ............... 73/4584
July 12, 1973 South Africa ............... 73/4732

[51] Int. Cl.² ..................................... B21C 47/04
[52] U.S. Cl. ............................ 72/148; 29/455 R; 72/168
[58] Field of Search ............... 72/146, 148, 172, 168, 72/179, 181; 29/156.6, 156.61, 163.5 F, 455; 277/204; 242/71.9, 73

[56] References Cited

U.S. PATENT DOCUMENTS

| 687,443 | 11/1901 | Succie | 242/71.9 |
| 817,345 | 4/1906 | Slick | 72/181 |
| 1,354,951 | 10/1920 | Buhtz | 72/168 |
| 1,646,992 | 10/1927 | Cody | 29/156.61 |
| 2,247,952 | 7/1941 | Laxo | 72/172 |
| 2,579,858 | 12/1951 | Price | 72/148 |
| 3,411,734 | 11/1968 | Greenberg et al. | 242/71.9 |
| 3,447,759 | 6/1969 | Rau | 242/71.9 |
| 3,905,090 | 9/1975 | Painter | 29/455 |

FOREIGN PATENT DOCUMENTS

| 184,267 | 6/1887 | France | 72/168 |
| 172,765 | 7/1906 | Germany | 72/181 |
| 477,590 | 1/1938 | United Kingdom | 72/181 |

*Primary Examiner*—E. M. Combs
*Attorney, Agent, or Firm*—Sughrue, Rothwell, Mion, Zinn and Macpeak

[57] ABSTRACT

This invention is concerned with apparatus for manufacturing spirally wound gaskets. The apparatus includes a pair of co-planar radially movable forming discs and independently mounted and axially adjustable guide members. The apparatus may be used either for winding gasket forming material tightly around one forming disc, or adapted for centerless winding where gasket forming material is wound in a loop around one forming disc. Where thin, wide-flanged gaskets are to be wound, the forming disc which abuts the outer periphery of the gasket is shaped so as not substantially to curve gasket forming material in the direction away from the gasket periphery and thus produce stress in the gasket. Where the apparatus is designed for centerless winding, a template adapted to be disposed between the forming discs to move in conjunction with gasket forming material may be provided, particularly for forming non-circular gaskets.

12 Claims, 6 Drawing Figures

GASKET WINDING MACHINE

This invention relates to apparatus for manufacturing gaskets of the type generally referred to in the trade as "spirally wound gaskets."

Although spirally wound gaskets are usually of circular cross-section, other cylindrical shapes such as oval are also encountered. These gaskets comprise a progressively wound, V-shaped, strip of metal, usually steel, with a strip of filler material sandwiched between adjacent layers of the metal strip. Due to the V-shaped of the metal strip, the gasket is compressible to a certain degree in the axial direction. In use the gasket may be located between the flanges of contiguous tubular elements and compressed between these to form a substantially air-tight seal. It is normal practice to provide a spacer in the nature of a flat annulus around the gasket to prevent excessive compression of the gasket.

Known machines for forming spirally wound gaskets comprise a rotatable disc onto which the gasket is wound, and a co-planar, freely rotatable, and radially movable wheel having a peripheral groove adapted to receive part of the peripheral zone of the disc, the side walls of the groove being adapted to act as a guide and lateral support for a gasket being wound onto the disc, and the inner peripheral face of the groove being adapted to abut with constant force a gasket being wound onto the disc to regulate the taughtness of the gasket winding.

The manufacturing process comprises feeding the strip of metal and packing strip onto the disc between the latter and the inner peripheral face of the groove on the wheel. As the gasket builds up on the disc, which is operatively driven, the wheel moves radially away from the disc while maintaining a constant force on the gasket.

With this type of machine the maximum width of winding is usually equal to the depth of the groove. It has been found that, should a wider gasket be wound, it becomes prone to collapse during the manufacturing process. In order to prevent collapse of a gasket during manufacture, it is further required that the width of the groove and the disc be substantially equal to the wall thickness of the gasket. In this way the side walls of the groove are able to lend lateral support to the gasket during manufacture. It will be appreciated that each different width or wall thickness of gasket calls for a different grooved wheel, while gaskets of different wall thickness or diameter also each require a different size disc. Thus with a machine of this nature a vast number of components are required to produce a reasonable range of gaskets.

A further known method of winding gaskets which will for the sake of convenience be referred to as "center-less winding" involves the use of a machine similar to the one described above. With such a machine, however, the grooved wheel is operatively driven while the disc is either freely rotatable or synchronously driven with the grooved wheel.

With this arrangement the gasket is not wound tightly onto the disc but in a loop therearound. It has been found that frictional association between the side walls of the groove in the grooved wheel and the sides of a gasket being wound sets up a shear force in the gasket in a direction to tighten the gasket. In this way a tightly wound gasket is obtained without winding it onto the disc. A machine of this nature eliminates the necessity of a different diameter disc for each different internal diameter of gasket. However, different discs are still required for gaskets having different wall thicknesses, whereas gaskets with different wall thicknesses or different widths of winding also each require separate grooved wheels.

A disadvantage associated with known methods of winding gaskets is that difficulties in the form of warping or collapsing are encountered when a large diameter gasket with a large flange width is wound. This tendency of a gasket to warp or collapse can be attributed to radial stress in the gasket winding caused by the contrary curves of the gasket forming wheels. Thus, while the wheel around which the gasket is wound presents a convex curve in respect of the inner periphery of the gasket, the grooved wheel has a contrary curved operative face in respect of the gasket. While a width of gasket winding is small, the gasket is relatively incompressable in a radial direction, and the contrary curve of the grooved wheel in respect of the winding has no appreciable influence. It has been found that, as soon as the width of gasket becomes relatively large, the winding becomes compressable to a certain degree, and the contrary curve of the grooved wheel tends to shape the outer layers of winding in a direction away from the gasket, thus setting up stresses therein.

It is an object of the present invention to provide an apparatus suitable for manufacturing spirally wound gaskets, which the applicant believes will have advantages over known apparatus.

According to the invention, apparatus suitable for manufacturing spirally wound gaskets comprises at least two co-planar forming discs defining between them a nip adapted to receive gasket forming material so as to wind the material around one disc, and at least one guide member for the material located on each side of at least one of the discs and mounted independently thereof, the arrangement being one wherein at least one forming disc is radially movable relative to the other. In one arrangement the gasket forming material may be wound onto the periphery of one of the discs so that such disc acts as a temporary core for a gasket being formed. Alternatively, the material may be wound in a loop around one disc, the disc being in the nature of stationary planetary wheel in respect of the gasket being formed.

Preferably the disc around which the gasket is wound is radially fixed while the other forming disc is movable relative thereto. For most applications of the invention, the guide members also are radially fixed, but, where the disc around which the gasket material is wound is radially movable, it may be desirable to have the guide members movable in conjunction therewith.

Further according to the invention, the radially movable disc is biased towards the other disc to exert a substantially constant force on the gasket forming material at the nip.

Still further according to the invention, the forming disc adapted to abut the outer periphery of the gasket is provided with a slip-surface in the region of the nip, the surface being shaped so as not substantially to curve gasket material passing through the nip in the direction away from the gasket periphery. By "slip-surface" is meant a surface having a low co-efficient of friction in respect of gasket forming material.

The shape of the surface at the nip is preferably planar or concave in respect of the gasket being formed. Although not preferred, a convex surface of large radius may also be suitable, the criterion being to have a surface which will not tend to curve a gasket material in the direction away from a gasket periphery. In a preferred arrangement, the slip-surface is in the nature of a movable endless track adapted to abut the gasket material at the nip. The track may for example be an articulated chain mounted on a plurality of rollers provided on the forming disc. The track may be either freely movable or driven synchronously with the forming disc around which the gasket is wound.

Further still according to the invention the guide member is a cylindrical element, in certain arrangements a disc, presenting a substantially flat face to the side of the forming disc alongside which it is located. A preferred location of the guide members is adjacent the periphery of the disc around which the gasket forming material is wound and on either side of the other forming disc. Preferably also only two guide members are employed, one on each side of a forming disc. In this way the guide members support and guide the gasket forming material in the region where it is sandwiched between the forming discs.

An arrangement is also envisaged where the guide members are in the form of rollers located on each side of a forming disc with their axes substantially parallel to the plane of the discs.

Yet further according to the invention at least one of the guide members is axially movable to adjust the space between the members, thus permitting accommodation of gaskets of different widths.

In the arrangement where the gasket forming material is tightly wound onto one of the forming discs, it is preferred that such disc is operatively driven for rotational movement thereof, while the other disc may be either freely rotatable or synchronously driven. While, in this arrangement where the guide members are discs, the guide members will normally be fixed for rotational movement, they may in certain instances be freely rotatable or synchronously driven.

In the alternative arrangement where gasket forming material is wound in a loop around one forming disc, it is required that the guide members be capable of being operatively driven for rotational movement thereof, with the forming discs being either freely rotatable or synchronously driven. Preferably the forming disc around which the gasket extends is synchronously driven while the other disc is freely rotatable.

Further according to the invention, where gasket forming material is looped around one forming disc, a template, for giving the desired shape to the gasket, is provided between the forming discs to move through the nip in conjunction with the gasket forming material. The gasket is thus in effect wound onto the template. Perferably the template is made of substantially incompressible strip of sheet material such as a strip of spring steel. Where a non-circular template is required, the strip of steel may be given the required shape by mounting it on the periphery of a suitably shaped core of wood or other suitable material, with the strip projecting beyond at least one surface of the core for location in the nip.

In order further to illustrate the invention some examples are described hereunder with reference to the accompanying drawings wherein.

Figure 1:
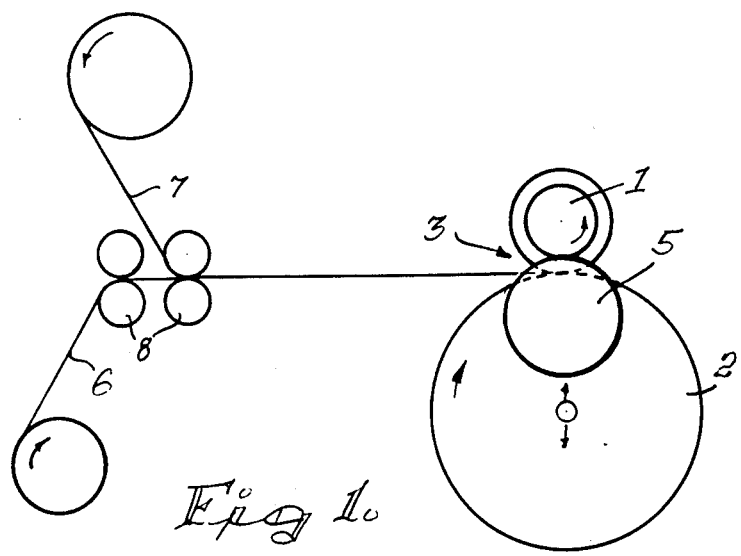
FIG. 1 is a schematic view of gasket forming apparatus.
Figure 3:
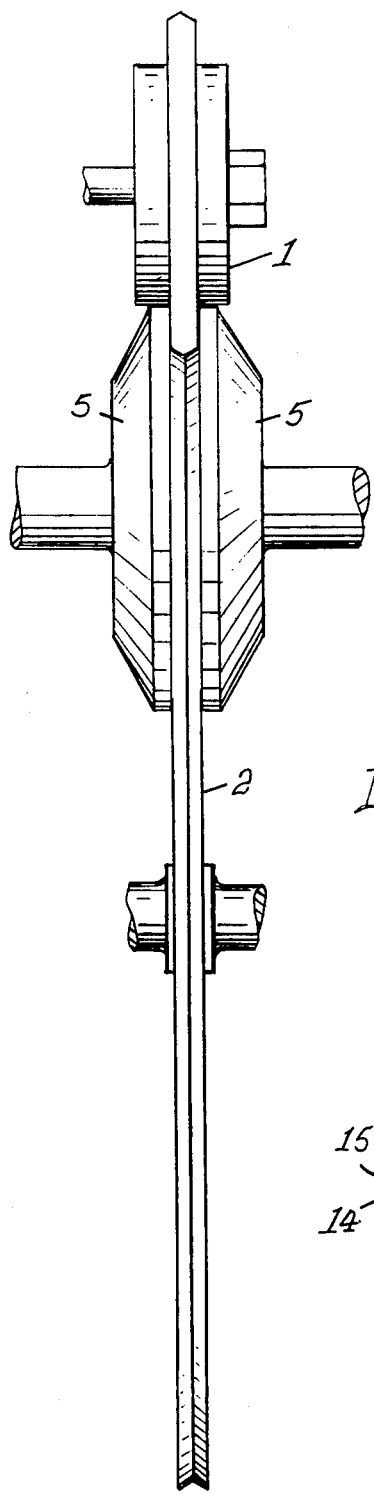
FIG. 3 is an elevation of constituent parts of the apparatus in FIG. 1.

Referring to FIG. 1 and FIG. 3, apparatus for manufacturing spirally wound gaskets comprises forming discs 1 and 2 defining between them a nip, generally indicated at 3, into which gasket forming material 4 is fed so as to be progressively wound onto the periphery of the disc 1, and guide members 5 located adjacent the disc 1 and on each side of the disc 2.

In the arrangement illustrated in FIG. 1, where the gasket forming material is tightly wound onto the disc 1, the latter is operatively driven for rotational movement thereof, while the disc 2 is preferably freely rotatable but may be driven synchronously with the disc 1. In this arrangement the guide members 5 will normally be stationary, but these too may be freely rotatable or synchronously driven.

While the disc 1 is fixed against radial movement, the disc 2 is radially movable relative to the disc 1 but biased towards the latter. The biasing means (not shown) is arranged to cause the disc 2 to exert a substantially constant force on the gasket material 4 as the latter is wound onto disc 1. The biasing means may conveniently be of an hydraulic or pneumatic type, but any other suitable means may be employed.

As illustrated in FIG. 3, the guide members 5 are in the nature of disc spaced from one another and each presenting a substantially flat surface to the sides of the disc 2. Since, in the arrangement illustrated in FIG. 1, the guide members are normally stationary, these need of course not be of circular configuration but may have any other suitable shape which will effectively perform the same function as those illustrated in FIG. 3. Preferably, however, at least one of the guide members should be axially movable by suitable reciprocating means (not shown) to adjust the space between them. In this way various widths of gasket material can be snugly received in the space between the guide members.

This invention also envisages guide members in the form of spaced rollers, (not shown) located adjacent the disc 1 with their axes substantially parallel to the plane of disc 2. Here also it is preferred that the space between the rollers be adjustable for the reason given above.

It is a feature of the invention that the disc 1 need not be receivable in the space defined by the guide members 5, which is a requirement with known apparatus. In this way gaskets with different wall thicknesses can be manufactured without the need to replace the disc 2. All that is required is that the space between the guide members be adjusted in accordance with the width of the gasket material and that a disc 2 which corresponds approximately with such width be employed.

The gasket forming material employed generally comprises a strip of steel 6 and a strip of filler material 7 adapted to be sandwiched between adjacent layers of the strip 6. The strip 6 is of V-shaped section and is formed to such shape by rollers 8. In practice a gasket is made by feeding the V-shaped strip 6 into the nip 3. After a first winding onto disc 1, the end of the strip 6 is secured to a subsequent winding by means of a resistance welding process, with the strip 6 together with filler material 7 thereafter being wound onto disc 1 until the desired width of gasket is obtained. The outer layer of the strip 6 may again be secured to a former layer by means of resistance welding. In order to release the gasket from the disc 1 the latter is moved in an axial direction so that the guide members 5 act to urge the gasket from the disc.

Figure 2:
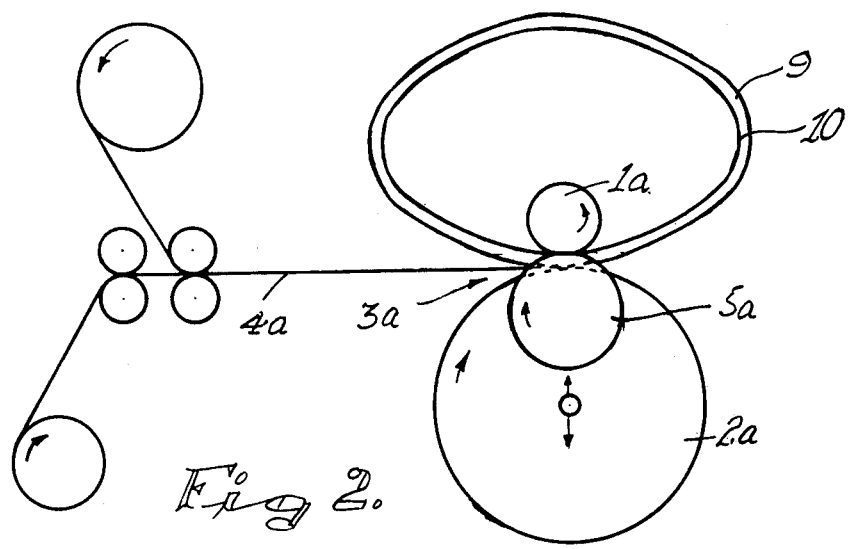
FIG. 2 is a schematic view of another gasket forming apparatus.

An alternative embodiment of the invention, where gasket material is wound in a loop, i.e., freely formed without using a template, around the disc 1a, is illustrated in FIG. 2. The constituent parts of the apparatus employed are similar to those in the apparatus in FIG. 1, the effective difference in the apparatus being in the operative rotation of the parts. In this variation the guide membrs 5a are operatively driven for rotational movement thereof while the forming disc 1a is either freely rotatable or preferably synchronously driven. It is required therefore that guide members 5a be of a shape capable of performing the task of guiding the gasket forming material 4a while rotating. Suitable shapes which come to mind are discs as shown in FIG. 3 or rollers as previously disclosed herein. The forming disc 2a in this case is preferably freely rotatable, but may be synchronously driven with the guide members.

During manufacture the frictional association between the operative faces of the guide members 5a and the gasket material of a gasket being wound sets up a shear force in the gasket in a direction to tighten the gasket winding. While this force allows a tightly wound gasket to be obtained with this manner of manufacture, it likewise causes problems of excessive taughtness of the winding resulting in distortion of the gasket. In order to eliminate this problem, a template 10, preferably in the form of a steel band, may be located between the forming disc 1a and the gasket 9. During manufacture the band 10 may be slackened from time to time to give the correct taughtness of winding. The use of a template has the added advantage that gaskets of various cylindrical shapes can be wound by the apparatus. Formerly non-circularly shaped gaskets were wound onto a suitably shaped core or mandril.

Figure 4:
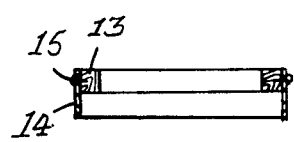
FIG. 4 is a sectioned elevation of a template.

With the present apparatus shown in FIG. 2, a non-circular gasket can easily be made by providing a suitably shaped template. The template, shown in FIG. 4, may conveniently comprise a wooden core 13 of the desired shape, with a band of spring steel 14 wrapped around it, the band 14 extending below the lower edge of the core 13. Thus, in use the forming member 1a, FIG. 2, abuts the inner face of the band 14 while the gasket is wound onto the outer face thereof.

It will be apparant to a person skilled in the art that the apparatus illustrated in FIG. 2 has several other advantages over known gasket forming machines. For example, virtually any diameter shape, width or wall thickness of gasket can be made by merely adjusting the machine and providing a suitable template.

Figure 5:
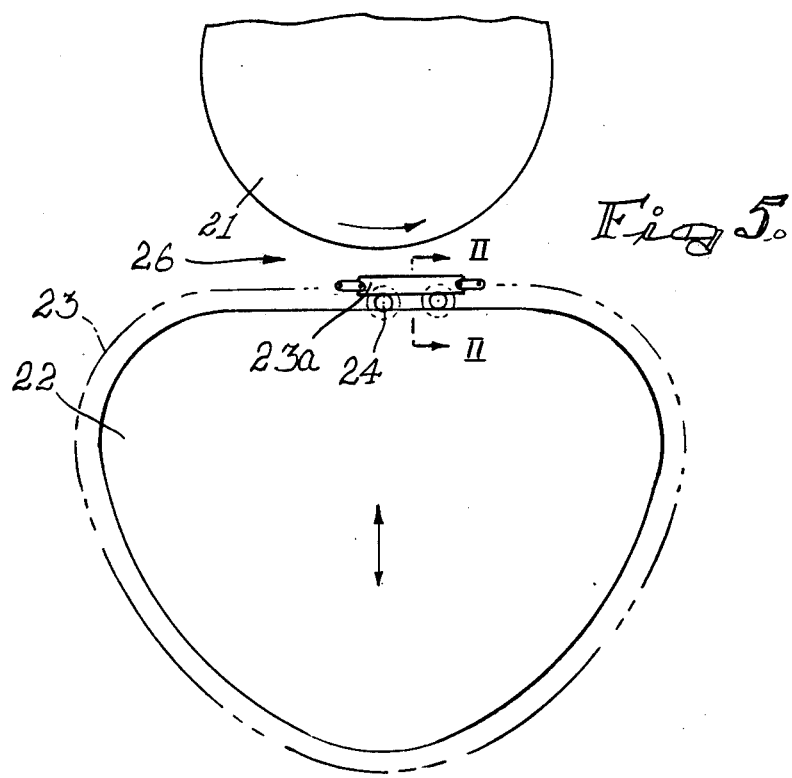
FIG. 5 is a schematic view of a different embodiment of the apparatus in FIG. 3

It has been found that, where a gasket of relatively large flange width and small thickness is wound, the gasket is prone to collapse or warp. This is due to the contrary curve of the forming disc which abuts the outer periphery of the gasket being wound. Where thin, wide flange gaskets are to be wound, the apparatus discussed previously may be modified to overcome this problem. Referring to FIG. 5, the forming disc around which the gasket is to be wound, is shown at 21, and the disc which abuts the outer periphery of the gasket shown at 22.

Figure 6:
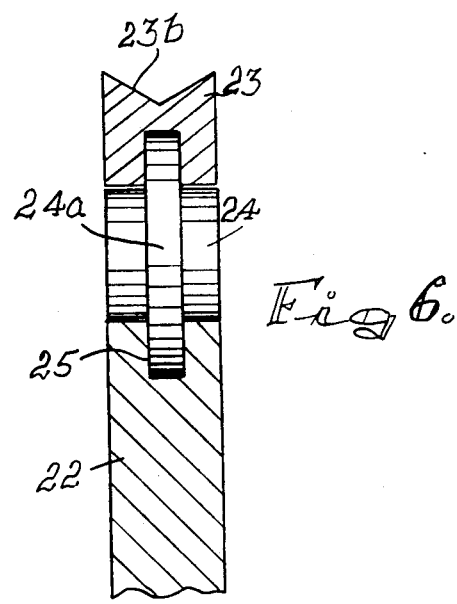
FIG. 6 is a sectioned elevation of the embodiment in FIG. 5.

The forming disc 22 is rotationally fixed and provided with a freely movable continuous track 23 around its periphery, the track 23 being mounted on a plurality of rollers 24 which in turn run in a groove 25 in the outer periphery of the disc 22. As shown in FIG. 6, the rollers 24 may conveniently be provided with a collar 24a on the body of the roller, the collar being adapted to be received in the groove 25 in the disc 22, and a corresponding groove in the track 23, while the body provides a bearing surface. The track 23 is in the nature of a chain comprising a plurality of segments 23a each pivotally linked to contiguous segments, as illustrated. Preferably, the outer surface 23b of the chain is shaped to conform to the shape of the gasket material. Normally, gasket material is of V-shaped or omega-shaped section.

In the arrangement illustrated in FIG. 5, the forming disc 22 is shaped so that the track 23 presents a substantially planar surface to gasket material passing through the nip. Alternatively the disc 2 may be shaped so that the surface is concave or slightly convex in respect of the disc 21. In this way gasket material passing through the nip is not curved away from the forming disc 21, around which the gasket is wound.

The embodiment illustrated in FIG. 5 is particularly suited for large diameter gaskets which have relatively large flange widths and small thickness.

Clearly many more variations of the invention exist, each differing in matters of detail only but in no way departing from the principles as set out in the appended claims.

I claim:

1. Apparatus suitable for manufacturing spirally wound gaskets, comprising at least two co-planar forming discs having differing diameters, defining between them a nip adapted to receive gasket-forming material so as to wind the material around the smaller diameter disc, and at least one guide member for the material located on each side of the larger diameter disc, and mounted on an axis displaced from the axes of said forming discs, the arrangement being one wherein at least one forming disc is radially movable relative to the other forming disc and movable with respect to said guide member, and the radially movable forming disc is flanked by at least a portion of the guide member and movable in the space between the guide members.

2. The apparatus according to claim 1 wherein the larger diameter disc is freely rotatable whereby the gasket-forming material is wound in a loop around the smaller diameter disc.

3. The apparatus according to claim 1 wherein the smaller diameter disc around which the gasket is wound is radially fixed while the larger diameter forming disc is movable relative thereto.

4. The apparatus according to claim 1 wherein the guide members are radially fixed.

5. The apparatus according to claim 3 wherein the, larger diameter radially movable disc is biased towards the smaller diameter disc to exert a substantially constant force on the gasket forming material at the nip.

6. The apparatus according to claim 1 wherein the guide member is in the nature of a disc disposed adjacent the periphery of the smaller diameter forming disc around which the gasket forming material is wound and alongside the larger diameter forming disc, the guide member presenting a substantially planar surface to the latter forming disc.

7. The apparatus according to claim 1 wherein said guide members are in the form of rollers located adjacent the periphery of the smaller diameter forming disc around which the gasket forming material is wound and alongside the larger diameter forming disc, the axes of the rollers being substantially perpendicular to the plane of the forming discs.

8. The apparatus according to claim 1 wherein at least one of the guide members is axially movable to adjust the space between the members to permit accommodation of gaskets of different widths.

9. The apparatus according to claim 2 wherein a template in the form of an endless band is provided between the forming discs, the template being adapted to move through the nip in conjunction with the gasket forming material so that the latter is wound onto the template.

10. The apparatus according to claim 9 wherein the template comprises a substantially incompressible strip of sheet material, such as a steel strip.

11. The apparatus according to claim 9 wherein the template comprises a strip of substantially incompressible sheet material, such as steel disposed around the periphery of a core member which is profiled to the desired shape of the gasket to be formed, the strip projecting beyond the surface of at least one side of the core member for location in the nip.

12. The apparatus according to claim 1 wherein the larger diameter disc is synchronously driven with said guide members whereby the gasket-forming material is wound in a loop around the smaller diameter disc.

* * * * *